United States Patent [19]

Seidel

[11] 4,383,316
[45] May 10, 1983

[54] APPARATUS FOR AND METHOD OF COLLATING PARTITIONED TIME DISORDERED SYNCHRONOUS DATA STREAMS

[75] Inventor: Harold Seidel, Warren, N.J.

[73] Assignee: Bell Telephone Laboratories, Incorporated, Murray Hill, N.J.

[21] Appl. No.: 140,312

[22] Filed: Apr. 14, 1980

[51] Int. Cl.³ .............................................. H04J 15/00
[52] U.S. Cl. ..................................... 370/118; 179/5 P
[58] Field of Search ............... 370/114, 118; 179/5 P, 179/2 A; 358/257

[56] References Cited

U.S. PATENT DOCUMENTS

| | | | |
|---|---|---|---|
| 2,752,484 | 6/1956 | Ross | 370/118 |
| 3,482,048 | 12/1969 | Takada et al. | 370/118 |
| 3,740,482 | 6/1973 | Plank et al. | 370/118 |
| 3,761,632 | 9/1973 | Colman | 179/5 P |
| 3,914,538 | 10/1975 | Perreault et al. | 358/257 |
| 3,962,634 | 6/1976 | Russo | 325/6 |
| 4,153,916 | 5/1979 | Miwa | 358/257 |
| 4,179,587 | 12/1979 | Herschtal | 179/15 AT |

Primary Examiner—Joseph A. Orsino, Jr.
Attorney, Agent, or Firm—R. O. Nimtz

[57] ABSTRACT

Digital carrier channels and switching systems in a telecommunications facility may be used to transmit a high-speed data signal between an originating end and a terminating end. At the originating end, the high-speed data signal is distributed either bit-by-bit or sample-by-sample and sequentially to a predetermined plurality of lower speed channels. At the terminating end, the lower speed channels are collated to reconstruct the original high-speed data signal, using submessage sequence identifying signals.

18 Claims, 5 Drawing Figures

APPARATUS FOR AND METHOD OF COLLATING PARTITIONED TIME DISORDERED SYNCHRONOUS DATA STREAMS

BACKGROUND OF THE INVENTION

1. Field of the Invention

This invention relates to digital transmission systems and, more particularly, to the transmission of a single high-speed serial data stream between two points using a plurality of lower speed telecommunications channels.

2. Description of the Prior Art

It is well known in the prior art how to multiplex a plurality of lower speed data signals so as to produce a signal that can be transmitted over a standard wideband digital telecommunications channel. Indeed telecommunications companies have been accepting data signals at standard rates of 2.4 kb/s, 4.8 kb/s, 9.6 kb/s, and 56 kb/s and performing the multiplexing at telephone central offices. The use of standardized data signal rates enables use of the switched telecommunications network to interconnect various data terminals.

A signal which differs from one of the standard rates mentioned earlier requires processing to conform to the acceptable rates. This requirement places a substantial burden on the subscriber in several ways, one of which is limitation in the design of his terminal equipment.

Yet another problem arises when a customer wishes to transmit a data signal which has a repetition rate which is higher than the telecommunication company's carrier channel or that which a telephone switching system can handle. The only solution available in the prior art was to use wideband non-switched private line facilities between the two transmission terminals. This solution, however, required the installation of expensive transmission facilities dedicated to a single use.

SUMMARY OF THE INVENTION

In accordance with the illustrative embodiment of the present invention, a system is arranged for the transmission of a high-speed serial data stream between an originating end and a terminating end by distributing the high-speed serial data stream either bit-by-bit or sample-by-sample, sequentially, to a predetermined plurality of lower-speed channels. These lower-speed channels may comprise metallic wires, digital carrier, or fiberoptics facilities from the originating end to a first central office, from which the lower-speed channels may be routed over separate paths in the switched telephone network to a last central office. Consequently, the data in these lower-speed channels may not arrive simultaneously at the terminating end. In order to insure the original sequence, the several lower-speed channels are identified as to sequence and, in response to these identification signals, collated at the receiving end. These several lower speed channels can then be read in proper sequence to restore the original high-speed serial data. A terminating flag at the end of the message allows the transmission setup to be taken down.

This invention teaches means and a method for using standard telecommunications transmission and switching facilities between any two points in the transmission of high-speed data streams.

DETAILED DESCRIPTION

Figure 1:
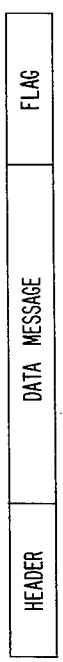
FIG. 1 is a block diagram of the data message format for transmission on a system in accordance with the present invention.

Referring to FIG. 1, there is shown a diagram of a message format in each channel of a transmission system. The format comprises a header block, a data message block and a flag block. The header block comprises information necessary to set up the required number of connections at the terminating end. The data message block comprises a part of the entire data message. The flag block comprises a part of a terminating flag which is necessary to inform the terminating end when a message is complete so as to enable the connections to be taken down.

Figure 2:
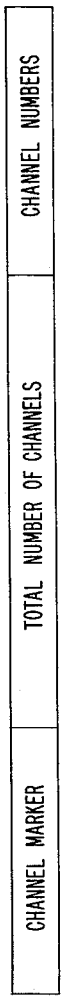
FIG. 2 is a block diagram of the header shown in FIG. 1.

Referring more particularly to FIG. 2, there is shown a detailed block diagram of the header block. The header comprises a channel marker, a number representing the total number of channels and the channel number of one particular channel. The channel marker is a start signal which may be a single bit or some other suitable code. The total number of channels informs the terminating end of how many channels are used to convey the entire data message. The terminating end then recognizes how many pieces of apparatus should be set up in order to receive the entire message and also when all channels have been received. The channel number enables the terminating end to identify a given channel. The necessity for this arrangement will become apparent in connection with the description for the terminating terminal in FIG. 5.

Figure 3:
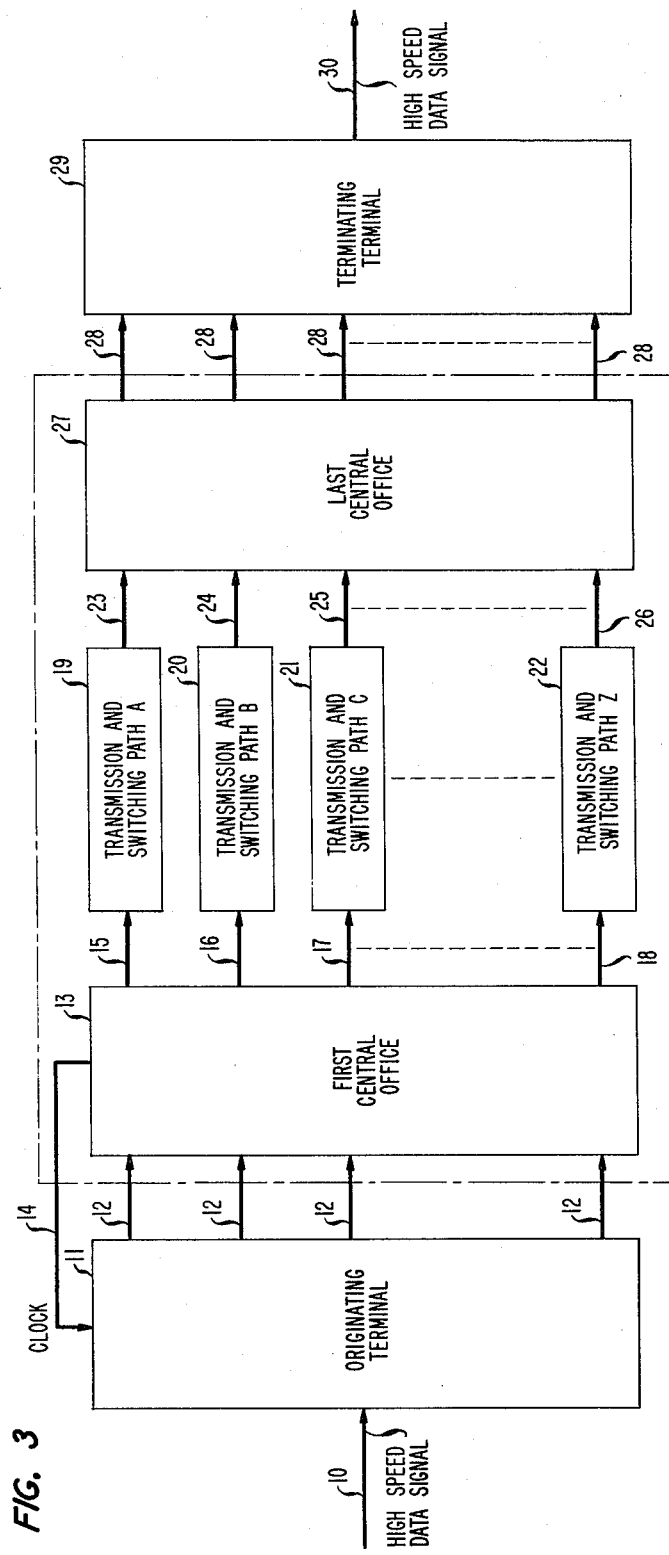
FIG. 3 is a general block diagram of a transmission system arranged for transmission of a high-speed serial data stream between two points in accordance with the present invention using a plurality of lower-speed channels which may be routed over different paths.

Referring more particularly to FIG. 3, there is shown a high-speed data signal lead 10 connected to an originating terminal 11. The originating terminal 11 may be located at the customer's premises, at a telecommunications company central office, or somewhere in between.

If a customer wants to transmit facsimile information contained on an 8-½ × 11 in. sheet of paper, for example, about 1 Mb are required to convey this information without data processing. If the customer is to transmit this information using standard T-1 carrier channels, each channel can carry information at the rate of 64 kb/s. However, the eighth bit is occasionally used for supervision; therefore only 56 kb/s are effectively available to the customer for transmission. The customer will then need 18 channels (1 Mb ÷ 56 kb/s) to transmit 1 Mb of information in one second. He may wish to reduce the number of channels and increase the time for transmission; for example, 8 channels can carry 1 Mb of information in 2 seconds. This is an economic tradeoff which the customer can resolve, based on considerations of cost, bandwidth, and availability of channels.

Having selected the number of channels, the customer proceeds to set up the connections to be made to the terminating terminal 29 by dialing a code, such as a telephone number, for each channel, similar to the procedure used in establishing a telephone call. When it is confirmed from the far end that the required number of channels are available and connections are made, the customer can transmit his message.

At the originating terminal 11, the high-speed serial data stream is distributed either bit-by-bit or sample-by-sample and sequentially to a predetermined plurality of lower-speed channels 12. The format for the data in each channel comprises a header: a channel marker, the total number of channels used in the transmission of the message, and the channel identification number; a portion of the data message; and parts of the terminating flag, as was described earlier in connection with FIGS. 1 and 2. The channels 12 are connected to a first central office 13. The originating terminal 11 derives its clock signal over lead 14 from the first central office 13.

At the first central office 13, when the code for each of the channels 12 was dialed at the originating terminal 11, individual routes were selected to reach the last central office, using standard telephone routing techniques. These routes may not necessarily share the same switching and geographic paths. Owing to the different routes, messages will reach the last central office 27 at different times.

The first central office 13 is connected by trunks 15,16,17 . . . 18 to transmission and switching paths 19,20,21 . . . 22, respectively. The transmission and switching paths 19,20,21 . . . 22 are connected by trunks 23,24,25 . . . 26 to a last central office 27. The last central office 27 is connected by a plurality of channels 28 to a terminating terminal 29. At the terminating terminal 29, data messages from the lower-speed channels 28 are collated to reproduce the original high-speed data signal on lead 30.

Figure 4:
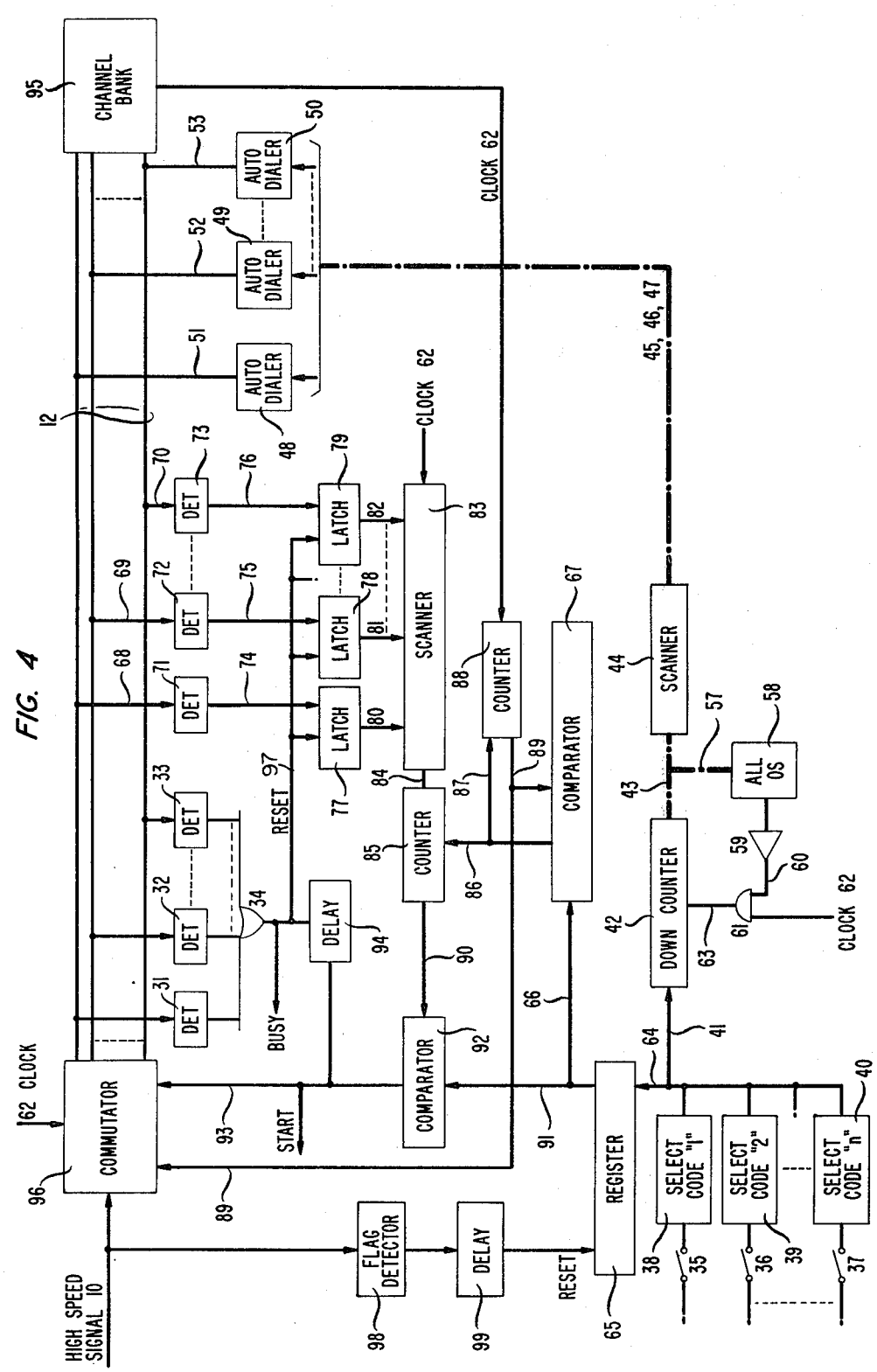
FIG. 4 shows a detailed block diagram of the originating terminal in the transmission system of FIG. 3.

Referring to FIG. 4, there is shown a detailed block diagram of the originating terminal 11. The high-speed signal on lead 10 enters a commutator 96. A plurality of channels 12 connect the commutator 96 with a channel bank 95. A clock signal on lead 62 is derived from channel bank 95 and is shown connected to the commutator 96. A start signal on lead 93 enables the commutator 96 to derive a plurality of separate messages from the high-speed signal on lead 10 and to distribute these messages on a selected number of lower-speed channels 12.

A plurality of switches 35,36 . . . 37 are each connected to a respective one of a plurality of select code generators 38,39 . . . 40. The select code generators 38,39 . . . 40 are connected by a common output lead 41 to a down counter 42. A plurality of leads 43 connect the down counter 42 with a scanner 44. Leads 45,46 . . . 47 connect the scanner 44 with a plurality of automatic dialers 48,49 . . . 50. Leads 51,52 . . . 53 connect the automatic dialers 48,49 . . . 50 with a plurality of channels 12. A plurality of leads 57 connect the down counter 42 with an all zeros detector 58. The output from the all zeros detector 50 is connected to inverter 59. A lead 60 connects the output from the inverter 59 to an AND gate 61. AND gate 61 connects lead 60 and clock signals on lead 62 to the down counter 42 via lead 63.

Closing one of switches 35,36 . . . or 37 causes a select code to be transmitted from a select code generator 38,39 . . . or 40 on lead 41. The select code represents the total number of channels 12 that will be required for the transmission of the high-speed data message as was explained earlier. The select code from lead 41 is registered in the down counter 42. Clock pulses on lead 63 cause the down counter 42 to generate sequentially coded pulses on the set of leads 43.

These pulses from down counter 42 cause a scanner 44 to sequentially place a signal on a selected number of leads 45,46 . . . 47. The signals on leads 45,46 . . . 47 cause each of the automatic dialers 48,49 . . . 50, after waiting for dial tone to appear, to generate a unique telephone code that identifies one of a plurality of lines at the terminating terminal 29 (FIG. 3). These codes, which may be telephone numbers, will cause the first central office to set up the desired number of telecommunications paths between the originating terminal 11 and the terminating terminal 29. The codes from the automatic dialers 48,49 . . . 50 are transmitted through leads 51,52 . . . 53 onto the channels 12.

When the down counter 42 has counted down to zero, the all zeros detector 58 energizes the inverter 59. Inverter 59 inhibits the AND gate 61. When AND gate 61 is inhibited, there will be no signal present on lead 63, thereby preventing the down counter 42 from continuing to count down.

Lead 64 connects the plurality of select code generators 38,39 . . . 40 to a register 65. Leads 66 connect the register 65 to a comparator 67. A clock signal on lead 62 is connected to a counter 88. Lead 89 connects counter 88 with the comparator 67 and with commutator 96. The output from comparator 67 is generated on a reset lead 86. This reset signal is also generated on lead 87 which connects comparator 67 with the counter 88.

The output from one of the select code generators 38,39 . . . 40 will be transferred by lead 64 to register 65. As discussed earlier, the select code is the total number of channels that will be used in the transmission of the high-speed signal. This number is stored in register 65. Register 65 provides this total number of channels, on lead 66, to the comparator 67. A clock signal on lead 62 causes the counter 88 to be incremented by one each time and register this count. Counter 88 provides this count on leads 89 to comparator 67 and to commutator 96. When the counter 88 has registered a number equivalent to the total number of channels used, that is, when the number on leads 89 is the same as the number on leads 66, the comparator 67 will place a reset signal on lead 86. This reset signal is also generated on lead 87 which causes the counter 88 to be reset to zero.

As described earlier, lead 89 also connects the output from counter 88 with commutator 96. The signals on lead 89 drive commutator 96, enabling it to multiplex the high-speed signal from lead 10 onto a predetermined number of lower-speed channels 12.

When the terminating terminal 29 has completed the connections, in acknowledgment signal will be generated for each of the channels 12. These acknowledgment signals must be detected to determine when all paths have been established so that commutator 96 may be enabled.

Leads 68,69 . . . 70 connect the plurality of channels 12 with detectors 71,72 . . . 73. Leads 74,75 . . . 76 connect detectors 71,72 . . . 73 with latches 77,78 . . . 79. Leads 80,81 . . . 82 connect latches 77,78 . . . 79 with a scanner 83. Clock pulses are supplied to scanner 83 over a lead 62. Scanner 83 is connected via lead 84 to a counter 85. Reset lead 86 connects comparator 67 with counter 85. Lead 90 connects counter 85 with comparator 92. Lead 91 connects register 65 with comparator 92. Lead 93 connects comparator 92 with commutator 96 and with a data apparatus (not shown) that generates the high-speed signal. Lead 93 is also connected to a delay unit 94. Reset leads 97 connect the delay unit 94 with latches 77,78 . . . 79.

Detectors 71,72 . . . 73 detect acknowledgment codes received from the terminating terminal 29. As described earlier, the acknowledgment code informs the originating terminal 11 that the terminating terminal 29 is ready to receive data on that given channel 12. When any one of the detectors 71,72 . . . 73 detects the acknowledgment code, a signal will be generated on the appropriate one of leads 74,75 . . . 76 which will cause the corresponding latch 77,78 . . . 79 to be set. Scanner 83, in synchronism with the clock pulses on lead 62, will sequentially scan the leads 80,81 . . . 82. When a signal is present on any one of these leads 80,81 . . . 82, scanner 83 will cause a pulse to be generated on lead 84. Lead 84 causes counter 85 to be indexed, thereby registering the total number of channels 12 returning an acknowledgment code. Counter 85 conveys its total number on leads 90 to comparator 92. Comparator 92 compares the number on lead 90 with the number on lead 91. When there is a match, a start signal will be generated on lead 93. The start signal enables the commutator 96. The start signal on lead 93 further enables the data apparatus (not shown) to begin generating the high-speed signal in the format described earlier. Start lead 93 is also connected through a delay circuit 94 to reset leads 97. Reset leads 97 cause the appropriate latches 77,78 . . . 79 to be reset.

However, if for any reason there is delay in receiving an acknowledgment code on any channel 12, scanner 83 will generate signals on lead 84 which will convey an inaccurate number to the counter 85. To avoid this erroneous number from being registered, counter 85 must be reset periodically. This is achieved by supplying counter 85 with a reset signal on lead 86.

The high-speed signal on lead 10 is also connected to a flag detector 98. When an end-of-message flag appears on lead 10, flag detector 98 enables delay circuit 99. After a predetermined period, sufficiently long to allow commutator 96 to complete its multiplexing function (described earlier), delay circuit 99 resets register 65.

If terminating terminal 29 is not available to receive a data message or if any of the required number of transmission or switching facilities is not available, a busy signal will be returned to the originating terminal 11. Such a busy signal may be detected by busy signal detectors 31,32 . . . 33. Busy signal detectors 31,32 . . . 33 connect channels 12 with an OR gate 34. The output from OR gate 34 is connected to reset leads 97. Signals on leads 97 cause latches 77,78 . . . 79 to be reset. The output from OR gate 34 also returns busy signal to the data apparatus (not shown).

While the preferred embodiment in FIG. 4 teaches use of the originating terminal 11 with digital facilities, it is a simple matter to use the originating terminal 11 with analog facilities. Indeed, such a use is expected, initially.

Figure 5:
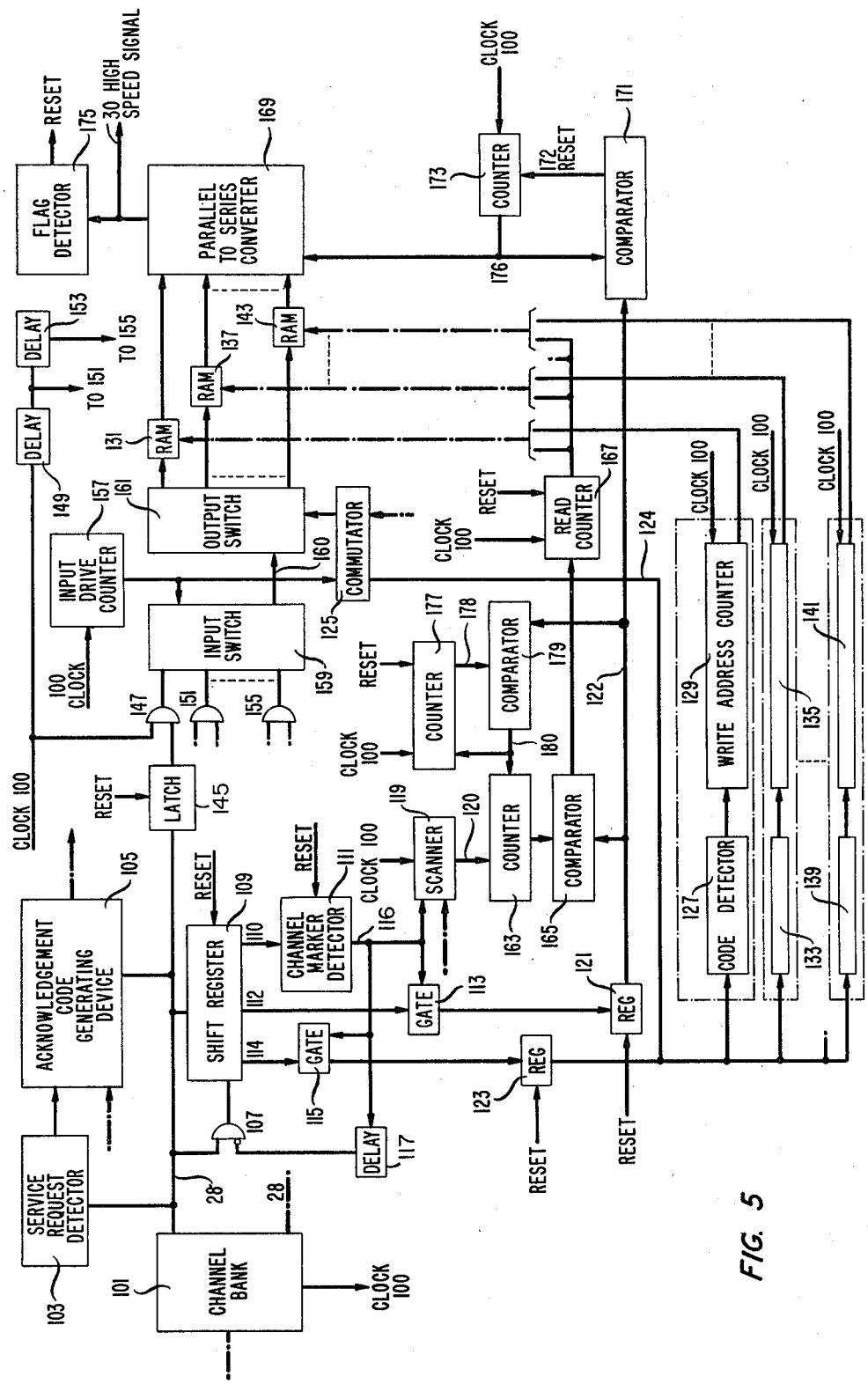
FIG. 5 shows a detailed block diagram of the terminating terminal in the transmission system of FIG. 3.

Referring to FIG. 5, there is shown a plurality of channels 28 connecting a channel bank 101 with a terminating terminal 29. The channel bank 101 may be located at the terminating central office 27, at the customer premises (not shown), or at some intermediate location. Service request detector 103 is connected to a first one of channels 28. An acknowledgment code generating device 105 is connected to the service request detector 103. Acknowledgment code generating device 105 is also connected to the first one of channels 28. Similar connections are provided for the remaining channels 28 (not shown).

When a signal (e.g., telephone ringing signal) is received from the terminating central office 27, the service request detector 103 recognizes that service is requested. Service request detector 103 enables the acknowledgment code generating device 105. Acknowledgment code generating device 105 causes an acknowledgment code to be generated and placed on the associated channel 28. The acknowledgment codes may be simple "off-hook" signals or tone or a combination of binary bits; or the code may involve some similar scheme.

AND gate 107 connects channel 28 with a shift register 109. A channel marker detector 111 connects shift register 109 with a scanner 119. Gate 113 connects shift register 109 with a register 121. Gate 115 connects shift register 109 with a register 123. A delay circuit 117 connects the output of the channel marker detector 111 with the AND gate 107.

When a message appears on channel 28, AND gate 107 causes the header to be entered in the shift register 109. When the shift register 109 is filled, its contents are placed in parallel on its output leads 110, 112 and 114. The channel marker detector 111 detects the channel marker, indicating that a message is about to be received, and places an enable signal on its output lead 116. Output lead 116 enables gate 113. A group of binary bits representing the total number of channels 28 used in this message is allowed to flow through gate 113 and be entered in register 121. The output lead 116 from the channel marker detector 111 also enables gate 115. Gate 115 allows a group of binary bits that identifies the particular channel that is received to flow through and be entered in register 123. Lead 116 from the channel marker detector 111 enables delay circuit 117. Delay circuit 117 inhibits the AND gate 107 thereby preventing any further entry of binary digits into the shift register 109 until detector 111 is reset.

Register 123, which holds the individual channel number, is connected to a commutator 125. The register 123 is also connected to a plurality of code detectors 127,133 . . . 139. Code detectors 127,133 . . . 139 are connected to a plurality of write address counters 129,135 . . . 141. Write address counters 129,135 . . . 141 are connected to a plurality of random access memories (RAMs) 131,137 . . . 143.

Lead 124 transmits the identity of the individual channel from register 123 to commutator 125. Commutator 125 periodically samples input lead 124 and similar input leads (not shown) from the other channels 28. The output from the commutator 125 is presented to the output switch 161. The commutator 125 is driven by an input drive counter 157.

Register 123 also conveys the individual channel number to the plurality of code detectors 127,133 . . . 139. One of the code detectors 127,133 . . . 139 will respond to the individual channel number and enable its output lead thereby causing one of the write address counters 129,135 . . . 141 to operate. Write address counters 129,135 . . . 141 are each provided with a clock signal 100. The write counter which is enabled will cause one of the plurality of RAMs 131,137 . . . 143 to be enabled so as to receive and store the message data. Each write counter 129,135 . . . or 141 acts as a modulo counter, reinitiating the count and rewriting on previously read data. Similar connections (not shown) are provided for the other channels 28.

The enable lead 116 connects channel marker detector 111 with a scanner 119. Scanner 119, in synchronism with a clock signal 100, periodically samples lead 116 and similar leads (not shown) from the other channels 28. Scanner 119 places an output signal on a lead 120 which is connected to counter 163. Counter 163 is connected to a comparator 165. Counter 163 places on its output lead a count of the total number of channels received.

Register 121, which has stored therein the total number of channels 28 used in this message, places an output signal on lead 122. Lead 122 is connected to comparator 165 and comparator 171. Comparator 165 is connected to a read counter 167. Read counter 167 is connected to a plurality of RAMs 131,137 . . . 143. Comparator 171 is connected by a reset lead 172 to a counter 173. Leads 176 connect the counter 173 with comparator 171 and to parallel-to-series converter 169.

When comparator 165 finds a match between the total number of channels (as indicated by the header) on lead 122 and the total number of channels (as counted by scanning the channels 28) from counter 163, comparator 165 will enable read counter 167. Read counter 167, in synchronism with clock signal 100, will simultaneously cause RAMs 131,137 . . . 143 to be read.

Counter 173 will be indexed by clock signals 100 and register a count. Counter 173 will place this count on its output leads 176. When comparator 171 finds a match on its input leads 176 and 122, it will cause a reset signal to be placed on lead 172. Reset signal on lead 172 will cause counter 173 to be reset.

Clock signal 100 is connected to counter 177. Lead 178 connects counter 177 to a comparator 179. Lead 122 connects register 121 to comparator 179. Output lead 180 connects comparator 179 with counter 163 and with counter 177.

After scanner 119 has scanned the output lead from channel marker detector 116 and the output leads from the other channel marker detectors (not shown), the counter 163 may not contain an accurate count of the channels. This may be due to delay in the arriving messages. Accordingly, counter 163 must be reset. This is achieved by comparator 179 periodically placing a reset signal on lead 180 when comparator 179 finds a match between the signals on its input leads 122 and 178.

Latch 145 is connected in series with the first channel 28 and an AND gate 147. AND gate 147 is connected to an input switch 159. Each of the remaining channels 28 are similarly connected to the input switch 159 using AND gates 151 . . . 155 and latches (not shown). Clock signal 100 is passed through a series of delay circuits 149 . . . 153. Clock signal 100 is connected to AND gate 147. The output from delay circuit 149 is connected to AND gate 151. Successive outputs are connected to the channels 28 (not shown). Clock signal 100 is connected to an input drive counter 157. Input drive 157 is connected to the input switch 159 and to the commutator 125.

The input switch 159, under control of the input drive counter 157 periodically samples the input leads from each of the channels 28 in sequence. This is accomplished by providing the delay circuits 149 . . . 153 in the clock signals, thereby causing a phase delay in successive channels 28 (not shown). As described earlier, the input drive counter 157 causes the commutator 125 to periodically sample each of its input leads and gate it to the output switch 161.

Input switch 159 is connected to the output switch 161 by time division bus 160. Output switch 161 is connected to a plurality of RAMs 131,137 . . . 143. The RAMs 131,137 . . . 143 are connected to a parallel-to-series converter 169.

The input switch 159, as described earlier, successively samples each of the channels 28 and places the signal on bus 160. The output switch 161 interprets the channel number received from the commutator 125 and marks the corresponding one of the RAMs 131,137 . . . 143. Output switch 161 then connects the corresponding one of the RAMs 131,137 . . . 143 to bus 160. The data signal is then entered and stored in that RAM or sector of that RAM. RAMs 131,137 . . . 143 are large enough in capacity to accommodate the longest delay in the transmission system. Alternatively, instead of RAMs, circular shift registers may be used as memory devices.

It is assumed that channels 12 and 28 are synchronous, i.e., that the difference between the clock signals at a master and at each of the terminals 11 and 29 are so minute that data signals being transmitted at 64 kb/s will not become asynchronous. Such an assumption permits use of finite sized memory devices.

When counter 173 enables the parallel-to-series converter 169, converter 169 reads the signals in parallel on its input leads from RAMs 131,137 . . . 143 and converts these signals to series format and places them on output lead 178. The signal on lead 178 is the high-speed signal which was received from the customer on lead 10 as shown earlier in connection with FIG. 3.

The parallel-to-series converter 169 is connected to a flag detector 175. The flag detector 175 monitors the high-speed signal on lead 30 and compares this signal with a stored pattern. When the flag detector 175 detects a flag at the end of the message, it will enable its reset lead. The reset lead will cause the various counters and registers as shown in FIG. 5 to be reset. The telephone connections can also be taken down in response to the output of flag detector 175, for example, by providing an "on-hook" signal to the last central office 27 (FIG. 3).

It is to be noted that channels 12,28 are not necessarily dedicated facilities or private lines. Indeed, such channels 12,28 when not in use for the transmission of high-speed data may be used for other services.

With correct planning, many of the unused equipment in FIGS. 4 and 5 may be used for simultaneous data transmission or even for other services.

With modifications of the present invention it is possible to use the terminals in a duplex mode, for transmission of high-speed serial data streams.

I claim:

1. A digital transmission system arranged for transmission of a high-speed serial data stream between an originating end (11) and a terminating end (29) separated geographically
    characterized by
    at said originating end (11), means (96) for distributing said high-speed serial data stream either bit-by-bit or sample-by-sample and sequentially to a predetermined plurality of lower-speed channels (12), at least one of said lower-speed channels being different in length relative to the other channels,
    means for asynchronously transmitting signals on each of said lower-speed channels in a message format including a start-of-message signal and an end-of-message signal,
    at said terminating end (29), means (127,133 ... 139) for identifying each of said lower-speed channels (28), and means (125,159,161) responsive to said start-of-message signals for collating the signals on said lower-speed channels (28) to derive said high-speed serial data stream.

2. The digital transmission system according to claim 1 characterized by means (131,137 ... 143) connected to said collating means for storing the data received from each of said lower-speed channels (28).

3. The digital transmission system according to claim 2 characterized by at said terminating end (29), means (111,119,121,163,165) for identifying the last of said signals to arrive on said lower-speed channels (28), and means (167) responsive to said identifying means (111,119,121,163,165) for enabling said storage means (131,137 ... 143) to be read simultaneously.

4. The digital transmission system according to claim 2 characterized by means (167) for reading out the data from all of said storage means (131,137 ... 143), in parallel.

5. The digital transmission system according to claim 4 characterized by means (169) for converting said parallel data to serial form, thereby restoring said high-speed serial data stream.

6. The digital transmission system according to claim 5 characterized by means (175) for identifying a flag to indicate end of message, means for resetting equipment (109,111,121,123,145,167,177) at said terminating end (29), and means for indicating end of message to intermediate facilities (13,19,20,21 ... 22,27) and originating end (11), causing connections to be taken down, said intermediate facilities being located between said originating end and said terminating end.

7. A method for the transmission of a high-speed serial data stream between an originating end (11) and a terminating end (29)
characterized by
the steps of
at the originating end (11), distributing said high-speed serial data stream either bit-by-bit or sample-by-sample and sequentially to a predetermined plurality of lower-speed channels (12), at least one of said lower-speed channels being different in length relative to the other channels, asynchronously transmitting signals on each of said lower-speed channels in a message format including a start-of-message signal and an end-of-message signal, at the terminating end (29), identifying each of said lower-speed channels (28), identifying the last signal to arrive on said lower-speed channels (28), and restoring the proper sequence of said signals on said lower-speed channels in response to said start-of-message signals thereby reproducing said high-speed serial data stream.

8. The method according to claim 7 further characterized by
the steps of
at the originating end (11), formatting the data in each channel (12) to have the following structure (FIG. 1):

a header, a part of the data message, and a part of a flag.

9. The method according to claim 8 further characterized by
the steps of
at the originating end (11), introducing said flag, to indicate the end of said data message, at the tail end of said high-speed serial data stream, and distributing said flag bit-by-bit and sequentially to said lower-speed channels (12).

10. The method according to claim 7 further characterized by
the step of introducing
a delay sequentially to each of said signals in said lower-speed channel at the terminating end (29) thereby enabling the terminating end (29) to identify each of said lower-speed channels (28) and to store the data in a memory device (131,137 ... 143).

11. The method according to claim 7 further characterized by
the steps of
at the terminating end (29), providing a plurality of memory devices (131,137 ... 143) each with a capacity large enough to store data from said lower-speed channels till the last of said channels arrive.

12. The method according to claim 11 further characterized by
the steps of
reading the data in parallel from said memory devices (131,137 ... 143), and reproducing the original high-speed serial data stream by converting said data in parallel to a serial stream.

13. The method according to claim 7 further characterized by
the steps of
identifying a flag at the terminating end, resetting the equipment (109,111,121,123,145,167,177) at the terminating end, and thereby causing the entire setup from terminating end (29) to originating end (11) to be taken down.

14. A terminating terminal (29) for the transmission of high-speed serial data stream
characterized by
means for receiving asynchronous signals each having a start-of-message signal and an end-of-message signal on each of a plurality of incoming lower-speed channels, means (127,133 ... 139) for identifying each of said plurality of incoming lower-speed channels (28), at least one of said lower-speed channels being different in length relative to the other channels, means (125,159,161) responsive to said start-of-message signals for collating signals on said incoming lower-speed channels (28) to derive said high speed serial data stream, and means (131,137 ... 143) connected to said collating means for storing said signals received from each of said plurality of incoming lower-speed channels (28).

15. A terminating terminal (29) according to claim 14 characterized by means (103) for detecting a request for service, on each of said plurality of incoming lower-speed channels (28), from an originating terminal (11), and means (105) for generating an acknowledgment code, on each of said plurality of incoming lower-speed channels (28), to said originating terminal (11).

16. A terminating terminal (29) according to claim 14 characterized by means (111,119,121,163,165) for identifying the last of said signals to arrive on said plurality of incoming lower-speed channels (28), and means (167) responsive to said identifying means (111,119,121,163,165) for enabling said plurality of storage means (131,137 ... 143) to be read in parallel.

17. A terminating terminal (29) according to claim 16 characterized by means (169) for converting said parallel data to a serial format, thereby restoring said high-speed serial data stream.

18. A terminating terminal (29) according to claim 17 characterized by means (175) for identifying a flag to determine end of message, means for resetting equipment (109,111,121,123,145,167,177) at said terminating and (29), and means for indicating said end of message to intermediate facilities (13,19,20,21 ... 22,27) and said originating terminal (11), causing connections to be taken down, said intermediate facilities being located between said originating end and said terminating end.

* * * * *